US007069445B2

(12) United States Patent
Cheston et al.

(10) Patent No.: US 7,069,445 B2
(45) Date of Patent: Jun. 27, 2006

(54) SYSTEM AND METHOD FOR MIGRATION OF A VERSION OF A BOOTABLE PROGRAM

(75) Inventors: Richard Wayne Cheston, Morrisville, NC (US); Richard Alan Dayan, Wake Forest, NC (US)

(73) Assignee: Lenovo (Singapore) Pte. Ltd, Singapore (SG)

( * ) Notice: Subject to any disclaimer, the term of this patent is extended or adjusted under 35 U.S.C. 154(b) by 794 days.

(21) Appl. No.: 09/998,681

(22) Filed: Nov. 30, 2001

(65) Prior Publication Data

US 2003/0105968 A1    Jun. 5, 2003

(51) Int. Cl.
  *G06F 11/30* (2006.01)
  *G06F 11/00* (2006.01)
  *G06F 12/00* (2006.01)
(52) U.S. Cl. ............. 713/187; 713/189; 726/22; 726/24; 711/163; 711/165
(58) Field of Classification Search ........... 713/1–2, 713/100, 180, 187; 380/2
  See application file for complete search history.

(56) References Cited

U.S. PATENT DOCUMENTS

| 4,881,264 | A | * | 11/1989 | Merkle | 713/177 |
|---|---|---|---|---|---|
| 5,128,995 | A | * | 7/1992 | Arnold et al. | 713/1 |
| 5,355,489 | A | * | 10/1994 | Bealkowski et al. | 713/2 |
| 5,463,766 | A | * | 10/1995 | Schieve et al. | 713/2 |
| 5,475,839 | A | * | 12/1995 | Watson et al. | 713/2 |
| 5,802,277 | A | * | 9/1998 | Cowland | 713/200 |
| 5,828,888 | A | | 10/1998 | Kozaki et al. | |
| 5,961,642 | A | | 10/1999 | Lewis | 713/1 |
| 6,016,402 | A | | 1/2000 | Thomas et al. | |
| 6,158,002 | A | | 12/2000 | Kwan et al. | 713/2 |
| 6,263,431 | B1 | * | 7/2001 | Lovelace et al. | 713/2 |
| 2002/0166059 | A1 | * | 11/2002 | Rickey et al. | 713/200 |

FOREIGN PATENT DOCUMENTS

| EP | 1037133 A1 | 9/2000 |
|---|---|---|
| JP | 5274120 A | 10/1993 |
| JP | 8339303 A | 12/1996 |
| JP | 2000010694 A | 1/2000 |

OTHER PUBLICATIONS http://web.archive.org/web/19990225080749/http://www.wwnet.net/~stevelim/booting.html, Feb. 25, 1999 (last visited: Mar. 24, 2005).*
http://didyouknow.imation.com/information-art9.html (last visited: Mar. 25, 2005).*

* cited by examiner

*Primary Examiner*—Kim Vu
*Assistant Examiner*—Ponnoreay Pich
(74) *Attorney, Agent, or Firm*—Winstead Sechrest & Minick P.C.; Scott W. Reid

(57) ABSTRACT

A computer system (e.g., a personal computer (PC)) is loaded with multiple versions of the bootable program (e.g., an operating system (OS)). The boot record for each bootable program version is hashed to produce a digest and the digest is signed using the cryptographic signature engine using the program's private installation key. The resulting signature, along with data indicating the program's name and version, is stored in fields of the non-volatile memory. When the system boots with a version of the program, the active entry is decrypted and the resulting data is compared. If a new version is being booted, then it is determined if the new version is the alternative entry. If so, the active entry is discarded and the alternative version is moved to be the active entry and the system boots with the new version of the program.

54 Claims, 8 Drawing Sheets

1

SYSTEM AND METHOD FOR MIGRATION OF A VERSION OF A BOOTABLE PROGRAM

TECHNICAL FIELD

The present invention relates in general to methods for using multiple versions of a bootable program loaded on a computer system while protecting a usage limit on the bootable program versions.

BACKGROUND INFORMATION

With the introduction of Windows 2000 and now XP, Information Technology (IT) organizations are once again having to deal with the issue of when, not if, to migrate their Operating System (OS). Several factors affect their decision, like when to replace hardware, is the existing hardware capable, when are internal applications ready for the new OS, when will independent software vendor (ISV) applications be ready and how to prioritize all these options. As a result of the above questions, the ability to enable a personal computer (PC) to be booted easily to a new OS at a future time would be desirable. Most PC manufacturing or marketing organizations continue to bring out new PCs preloaded with a new OS before an IT organization is ready to make a major switch to the new OS. For example, manufacturers continue to offer similar computer system models loaded with Windows 98, 2000, ME and XP. As new PCs are manufactured, they may incorporate the latest version of an OS, so it would be desirable to allow a user to boot with an older version because various factors may favor delaying switching to the newest OS.

There is, therefore, a need for a method and supporting apparatus that allows PCs to be introduced with a switch mechanism that may be invoked at any time which enables booting with different versions of a bootable program or OS wherein the switch has sufficient security to protect against licensing abuse for program manufacturer.

BRIEF DESCRIPTION OF THE DRAWINGS

For a more complete understanding of the present invention, and the advantages thereof, reference is now made to the following descriptions taken in conjunction with the accompanying drawings, in which.

SUMMARY OF THE INVENTION

Figure 1:
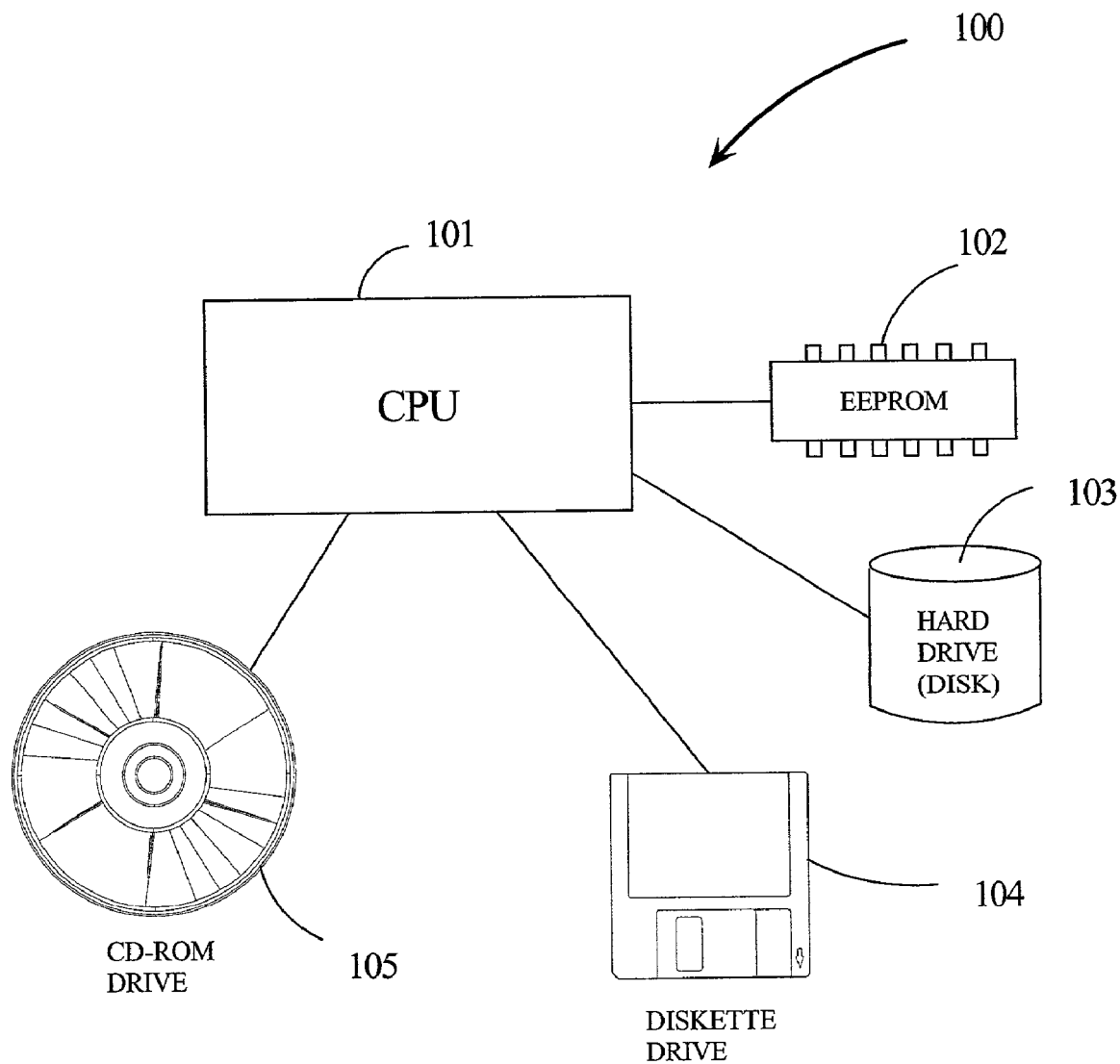
FIG. 1 is a block diagram of components of a computer system with various I/O units and non-volatile memory.

A bootable computer program (e.g., an operating system (OS)) that may have future version releases is modified to enable the program to recognize when various versions are present on a system. The system hardware is modified to include a read-only locking mechanism that works with a non-volatile memory available to the system. The computer system may be loaded with multiple versions of the bootable program. The programs are each loaded into their own partition on the hard file along with data indicating the program's name and its version. There may be as many as four partitions one of which is identified as the active partition. The master boot record (MBR) for the system maintains this identification. The boot record (BR) for each version of the bootable program is hashed producing a digest which is signed (encrypted) producing a signature. The signature for each bootable program version is stored in non-volatile memory in an version management table producing a primary entry, alternate entry and a third entry. The primary, alternate, and third entries have control fields that allow them to be read-only locked by the locking mechanism in the system. When the system powers up, the Power-On-Self-Test (POST) loads the BR for the program marked as the active partition (program that is booted) in the MBR. POST then decrypts the signature in the active entry in the non-volatile memory. The active entry identifies which loaded bootable program is to be booted. POST determines if the version of the bootable program in the active partition corresponds to the one identified in the active entry. If they match, the boot-up process proceeds by booting with the program in the active partition. If they do not match, then the alternative entry is checked. If the alternate entry is a match, then the active entry is erased and the alternate entry is moved to the active entry and the system boots with the alternative version of the program. If an additional version exists, then the third entry is moved to the alternative entry. A switch to a newer version of the bootable program is signaled by either having a utility change the contents of the active entry in the MBR partition table or by filling the third entry. If the third entry is valid on system power-up, POST is signaled to erase the active entry and shift contents of the alternate entry to the active entry. The system then boots with the alternate program indicated by the updated active entry. The contents of the third entry are moved to become the new alternate entry. The active and alternate entries are then locked by the locking mechanism while the third entry remains unlocked. If the third entry is not valid (may simply be empty), then POST proceeds with the compare of the active entry to determine if the switch has been signaled by a change to the active entry in the partition table in the MBR.

The foregoing has outlined rather broadly the features and technical advantages of the present invention in order that the detailed description of the invention that follows may be better understood. Additional features and advantages of the invention will be described hereinafter which form the subject of the claims of the invention.

DETAILED DESCRIPTION

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted in as much as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Embodiments of the present invention allow a user to operate a single version of a bootable program when multiple versions of the program reside on the computer system (e.g., a personal computer (PC)). In order for this feature to be operable, both system hardware modifications and Power-On Self Test (POST) routine modifications are necessary. In addition, a cryptographic digital signature engine (e.g., like used on IBM's PC 300 PL) is installed in the system. The bootable program being upgraded (e.g., an operating system (OS)) has modifications that instruct the operable PC when to switch to a bootable program version being signaled during a boot-up process or how to terminate the boot-up process if the requested new version is not loaded.

In describing the present invention, the example of an OS is used with the understanding that other types of bootable programs are within the scope of the present invention. The OS versions are each loaded onto their own partitions within the boot device with the boot record (BR) and data defining each OS version. One partition is identified as the active partition. A version management table in a non-volatile memory is used to identify which partition corresponds to the active entry (on power-up identifies which OS is booted), which partition corresponds to the alternate entry, and which partition corresponds to the third entry as described in embodiments of the present invention. The contents of the entries comprise a signature which results from signing a hash of the BR of each OS version along with additional defining data. Further details of these embodiments of the present invention are explained the in following which describes the modifications to the OS versions, POST and the operation of the hardware locking mechanism used in embodiments of the present invention.

The hardware modifications include the addition of a hardware locking mechanism. The table of BR digital signatures and associated information is maintained in the entries of some type of non-volatile memory technology which does not lose its contents when power is removed. Typically, a small flash memory or electronically erasable programmable read only memory (EEPROM) may be used to maintain the table required in embodiments of the present invention. In addition, control logic is required to provide write protection to the table's entries. Embodiments of the present invention have a first or primary entry, a second or alternate entry and third entry. This control logic is referred to as a read-only protection mechanism (hardware locking mechanism). This type of control logic is well known and understood in the current state of the art. The protection mechanism may be located almost anywhere in the PC system but it is typically located in the controller managing access to the non-volatile memory. The protection mechanism functions in the following manner. On power-up, the protection mechanism defaults to an unprotected state. This allows POST to have unlimited access as it is considered as "trusted". POST will lock or activate the individual control fields prior to booting the OS or system setup utilities unless prior arrangements have been made to leave the protected entries open for access after the boot process begins. There is one control field for each of the three entries in non-volatile memory used in embodiments of the present invention. The control fields are typically accessed in the I/O address space of the microprocessor of the CPU. However, some computer architectures allow the control fields to be memory mapped.

Once the control field is enabled, the locking mechanism sets whether write protection only (read-only access permitted) or read/write protection is active. The lock is maintained until the system is powered-off. The locking mechanism works by monitoring accesses to the associated non-volatile memory and the protected addresses within the non-volatile memory. Bus transactions to the non-volatile memory being protected are accepted if the target is valid, however, the data portion of the bus transaction is ignored. For example, on a write operation data is not taken from the bus; and on a read operation data is not supplied to the bus.

POST may be modified as described in the following. When POST is at a point where it is ready to boot the OS, it will read the master boot record (MBR) of the boot device. Accessing the partition table in the MBR, POST obtains the BR from the active partition. POST hashes the BR using an established algorithm, such as Secure Hash Algorithm (SHA)-1, and then saves the result of the hash (referred to as a digest) temporarily. SHA-1 is a popular one-way algorithm used to create digital signatures.

Next, POST reads the first or primary entry from the version management table in non-volatile memory and retrieves the OS loader's public key stored in a known location in non-volatile memory. The digital signature engine then uses the public key to decrypt the signature. The resulting digest is compared to the digest temporarily stored as described above. If they are the same, POST locks the first two entries in the table and turns control over to the MBR code to complete the boot process. If they are not the same, POST compares the digest from the active partition's BR to the digest of the signature contained in the alternative entry of the table. Again, the digest is formed by decrypting the alternate entry digital signature using the OS loader public key. If the two digest are equal, the system has signaled a change from one OS version to another. POST clears the first table entry, moves the alternate or second entry into the first entry and if a third entry is present moves it into the alternate entry. The third entry would then be cleared. POST then activates the control fields to write protect the first two entries and leaves the third entry open for access prior to booting the new primary OS. If the two digests do not match, POST hangs the system and will not complete the boot process. This occurrence may require someone with the system's configuration knowledge to remedy the situation so the system may be booted once again.

An OS used in embodiments of the present invention, is modified or enhanced to enable the described version management. The first modification implements an OS loader to present a menu or window to the installer to allow enablement of version management for the specific hardware platform. Once enabled, the OS loader prompts the installer to define which version of the OS is to be the active version and which is the alternate version. The alternate version may be used in the future to supplant the primary OS. The OS loader signs the BR of the primary OS and saves the digital signature of the BR in the active entry in the version management table stored in the non-volatile memory. Other information such as the OS name and the version number is also stored. The OS loader then activates the appropriate control field to lock the contents of the active and alternate entries to prevent them from being changed. The OS loader then signs the BR of the alternate OS and saves the digital signature and associated information in the alternate or second entry in the table stored in non-volatile memory. Once again, the OS loader activates (locks) the control field in order to write protect the second entry. The OS loader then updates the partition table in the MBR to indicate that the primary OS is in the active partition. The active partition on the boot device contains the OS that is to be booted. In both cases, the OS loader signs the BR using its public/private installation key pair. The OS loader also stores its public key in a known location in non-volatile memory along with the version management table. POST uses the public key to verify the signatures each subsequent time it is activated.

The OS loader also supports the capability to update a third entry in the table. The third entry is used to signal that a newer version of the OS has been loaded onto the system (into a third partition). Once the third entry has been completely filled in, its associated control field is activated in order to write protect the entry. When POST determines that a valid third entry is in the table on a subsequent boot up from a powered off state, it discards the first entry, moves the contents of the second entry to the first entry, and moves the contents of the third entry to the second entry. POST also updates the partition table located in the MBR of the boot device to indicate that the alternate partition represented by the second table entry, before update, is now the active partition to boot. POST also clears the third entry. POST then continues normal operations, as described herein, and boots the new version that was previously identified as being in the alternate partition. Prior to booting, POST will then activate the control fields for the primary and alternate table entries. The third entry is left open upon boot-up so the OS loader may access it.

If a system is to have the ability to boot from a selection of OS versions, then each OS should reside in its own storage partition. During OS installation, the installation program will hash the BR to produce a digest using a standard hashing technique like SHA-1. The BR is stored in a reserved sector on the hard file or disk. A boot sector refers to a class of sectors that are reserved on the disk for use in loading the OS. On start-up, the computer (system) searches for the MBR or something similarly named. The MBR is typically the first sector of the disk. The MBR contains a program that reads the partition table for the active entry which points to the first sector of the OS in the partition to be booted, commonly known as the active partition. That sector contains another small program that causes the computer system to boot the OS.

After hashing, the digest is signed using the cryptographic signature engine with the OS's private installation key. In other embodiments the signature function may be performed by firmware in the BIOS image.

After the digest is signed and encrypted as indicated, the resulting signature is stored in an available non-volatile memory. The signature is linked with a field, also stored in non-volatile memory, which has data indicating that the OS is the current booting OS, the name of the OS and the OS version number. The OS will then activate the hardware read-only locking mechanism so that the signature may not be modified. If a later version of the OS is then loaded onto another partition of the same system, the OS installation program will recognize that it is the second version of the same OS. The installation program then signs the BR for the second version and stores it in the second entry in the non-volatile memory along with a field containing the OS's name, its version number and an indication that it is the alternate OS. Again, the OS will activate a hardware read only locking mechanism for the entry in the non-volatile memory.

When a system is powered up, POST loads the BR from the active partition. It then decrypts the signature in the active entry in the non-volatile memory using the OS's public installation key. The resulting data is compared to the hash of the BR found in the active partition on the local boot device. If they are determined to be equal, then POST proceeds to boot the active OS. If they are determined not equal, then using the described process, POST compares the data from the decrypting process of the alternate entry in non-volatile memory to the hash of the BR in the active partition. If they are not equal, POST halts the process. If they are equal, then the active or first entry is cleared from the non-volatile memory. The alternate entry is moved to the first entry and if any new data exists in a third entry, then it is moved to the second or alternative entry position. In this fashion, the old version of the OS is effectively discarded and the newer or alternative version is booted from that point on. The POST check of the BR against the first entry of the non-volatile memory guarantees that the old version of the OS is not again booted. The OS vendor is therefore assured that only one copy of the OS is ever used.

FIG. 1 is a block diagram of system components of a computer system 100 suitable for practicing principles of the present invention. Central processor unit (CPU) 101 communicates with CD-ROM drive 105, Diskette drive 104 and Hard Drive 103 for data storage and retrieval. EEPROM 102 is a non-volatile memory that may be written to and locked such that selected data may not be rewritten.

Figure 2:
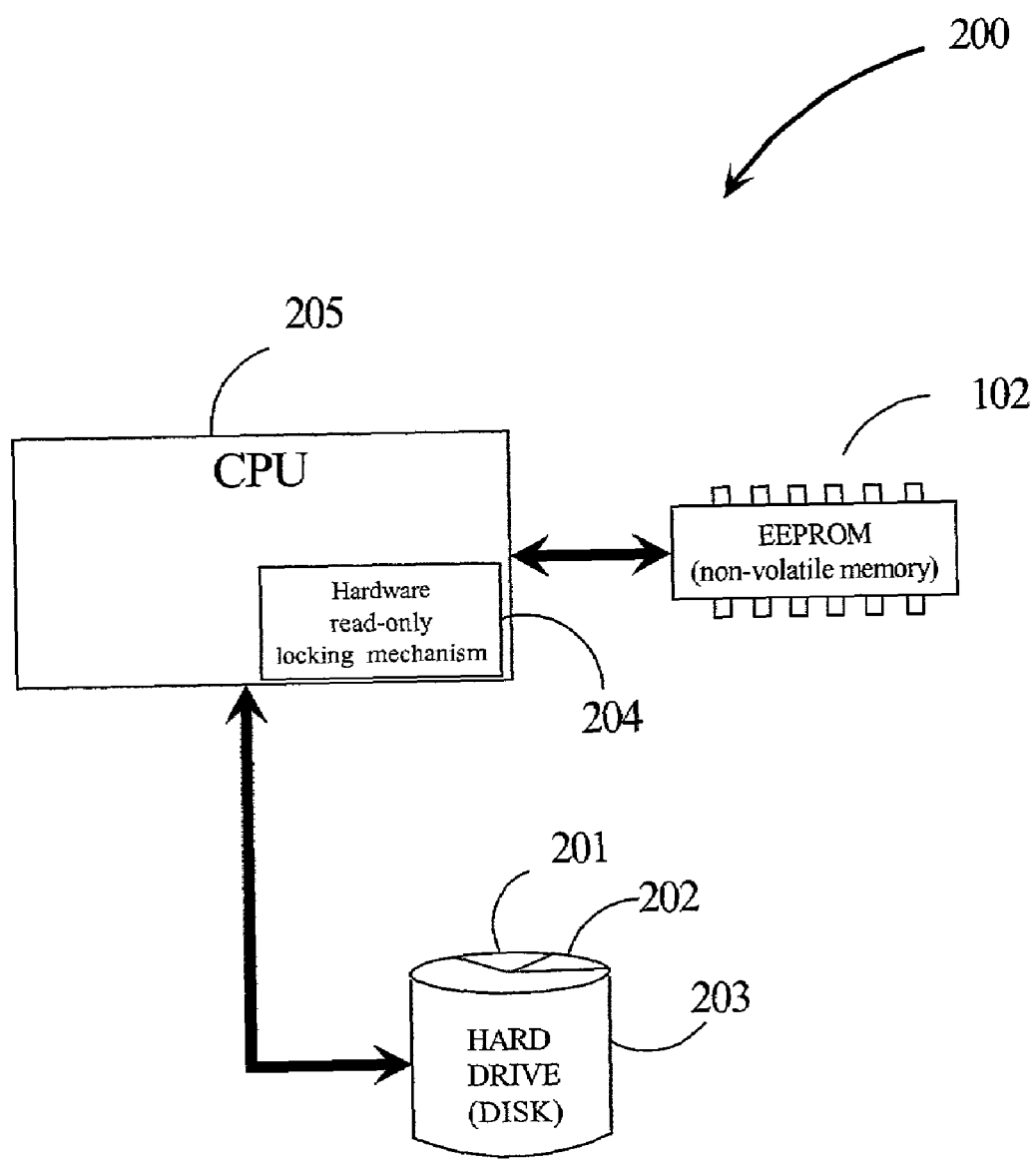
FIG. 2 is a block diagram of components of a computer system with hardware modifications for a read-only locking mechanism and secure disk sectors.

FIG. 2 is a block diagram of system components of computer system 200 where the hardware of CPU 205 has been modified to include hardware logic circuits 204 that implement a read-only locking mechanism for EEPROM 102. CPU 205 also communicates with Hard Drive 203 which has sectors (e.g., sectors 201 and 202) which may be partitioned and configured to store versions of a bootable program (e.g., an operating system (OS)) as described in embodiments of the present invention.

Figure 3:
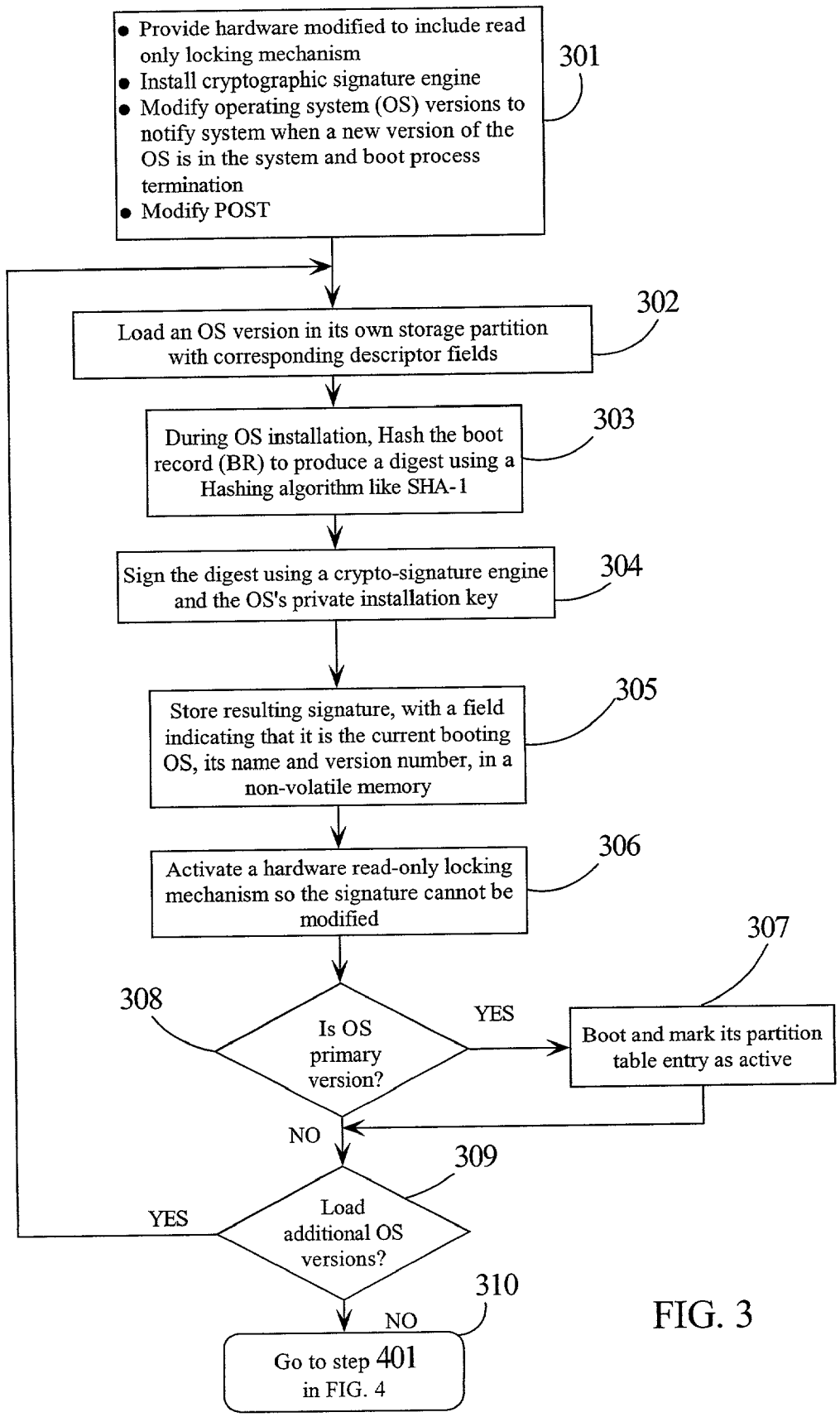
FIG. 3 is a flow chart of method steps in an embodiment of the present invention.

FIG. 3 is a flow diagram of method steps according to embodiments of the present invention for an OS. In step 301, a series of items are listed which may be required to practice embodiments of the present invention. The system hardware (e.g., CPU 201) is modified to include a hardware read-only locking mechanism 204 so selected data stored in EEPROM 102 may be locked in a way that prevents the data from being modified. While the data may be read, it may not be modified or erased while locked. In step 301, the OS being updated, for example Windows, is modified to add features that allow the OS to notify the computer system 200 that a new version of the OS is in the system. The OS is also modified to signal that the process of the present invention is to be terminated if selected criteria within embodiments of the present invention are not satisfied. In step 302, a version of the OS is loaded into its own storage partition in Hard Drive 203 along with corresponding descriptor fields (e.g., OS name and version number). In step 303, during OS installation, the BR is hashed using an algorithm (e.g., SHA-1) to produce a digest. In step 304, the digest is signed using a cryptographic signature engine (e.g., like used on IBM's PC 300 PL) and the OS's private installation key. In step 305, the resulting signature is stored in non-volatile memory 102 with a field indicating that the OS is the current booting OS along with a field with the OS's name and version. In step 306, the hardware read-only locking mechanism 204 is activated locking the signature so it cannot be modified. In step 308, a test is done to determine if the OS being loaded is the primary version. If the result of the test in step 308 is YES, then in step 307 the OS is booted and its partition is marked active in the partition table in the MBR. In step 309, a test is done to determine if any additional OS versions are to be loaded. If the result of the test in step 309 is NO, then a branch is taken to step 401 (see FIG. 4). If the result of the test is YES, then a branch is taken to step 302 when the next version is loaded. If the result of the test in step 308 is NO, then step 309 is executed as explained above. The process of loading OS versions continues until the result of the test in step 310 is NO. Only one version of the OS is assigned to the active partition at any time.

Figure 4:
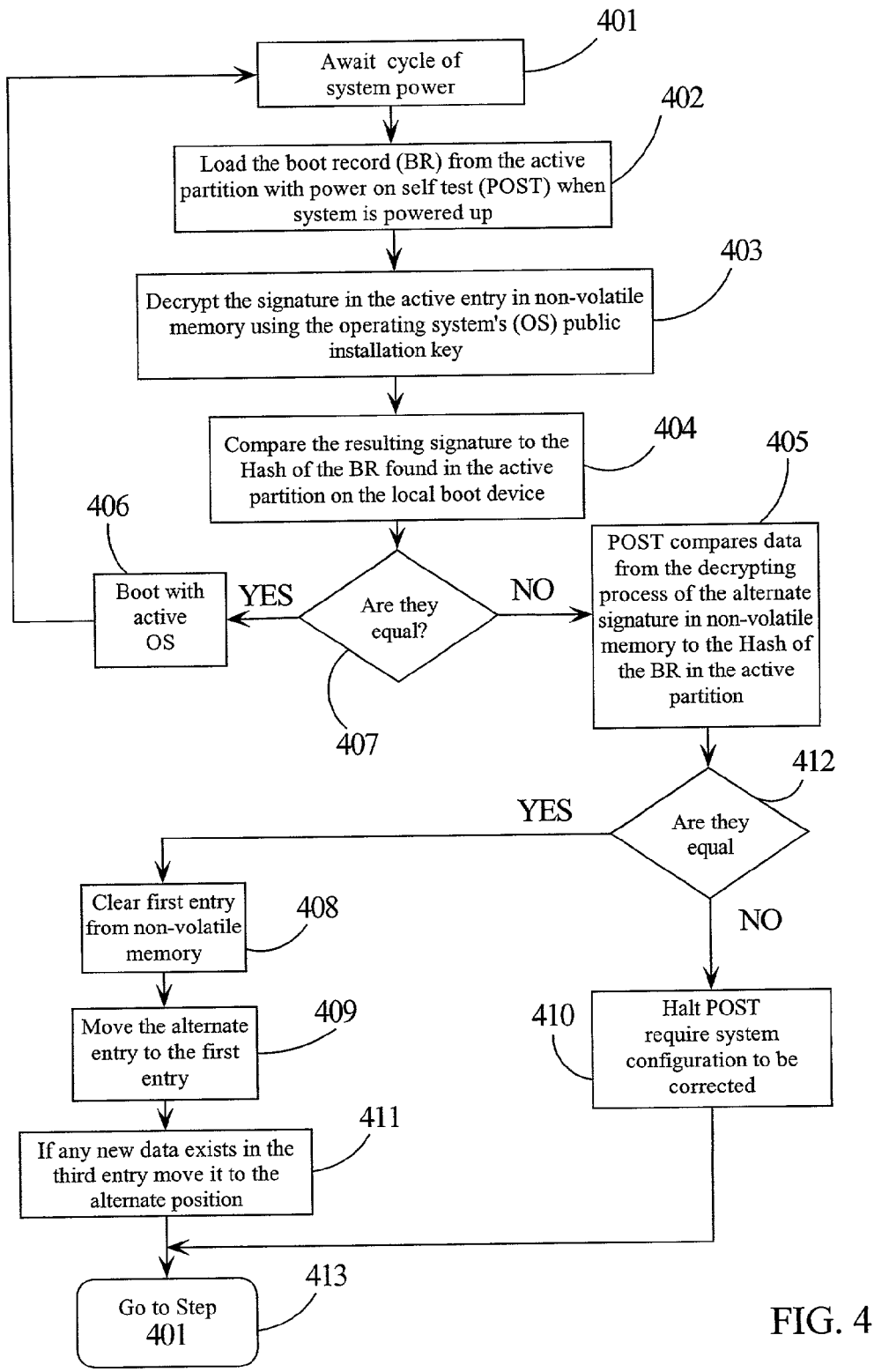
FIG. 4 is a flow chart of method steps in an embodiment of the present invention.

FIG. 4 is another flow chart of steps in an embodiment of the present invention for an OS. A wait for a system power cycle is done in step 401. In step 402, the BR from the active partition is loaded by the POST during power up. In step 403, the signature in the active entry of non-volatile memory 102 is decrypted by POST using the active OS's installation public key. In step 404, the resulting hash of the BR found in the active partition is compared with the data from step 403. In step 407, a test is done to determine if the compare in step 404 shows that they are equal. If the result of the test in step 407 is YES, then the requested boot OS version is the same as the OS version referenced in the active partition table entry of the non-volatile memory and the system 200 will boot with the OS version in the active partition. If the result of the test step 407 is NO, then a switch to another version of the OS has been signaled. Therefore, in step 405, POST compares the data from the decrypting process of the alternate signature in the non-volatile memory 102 to the hash of the BR in the active partition (the version the system is trying to boot). A test is done in step 412 to determine if they are equal. If the result of the test in step 412 is YES, the alternate version of the OS compares with the version of the OS with which the system 200 is trying to boot. Then in step 408, the first entry in the non-volatile memory 102 is cleared and in step 409 the alternate entry is moved to the first entry. In step 411, any new data (additional version of the OS) is moved into the alternate entry. Then, in step 413, a branch is taken back to step 401 awaiting another system power ON/OFF cycle. If the result of the test in step 412 is NO, then the system is trying to boot with a version that is not loaded and POST is halted. Action may be required at this time to correct the system configuration before continuation. After step 410, a branch is taken in step 413 back to step 401. In this process, the old version of the OS is effectively discarded and the non-volatile memory guarantees that the old version of the OS is never booted again. The OS vendor is thus assured that only one copy of the OS is ever used.

Figure 6:
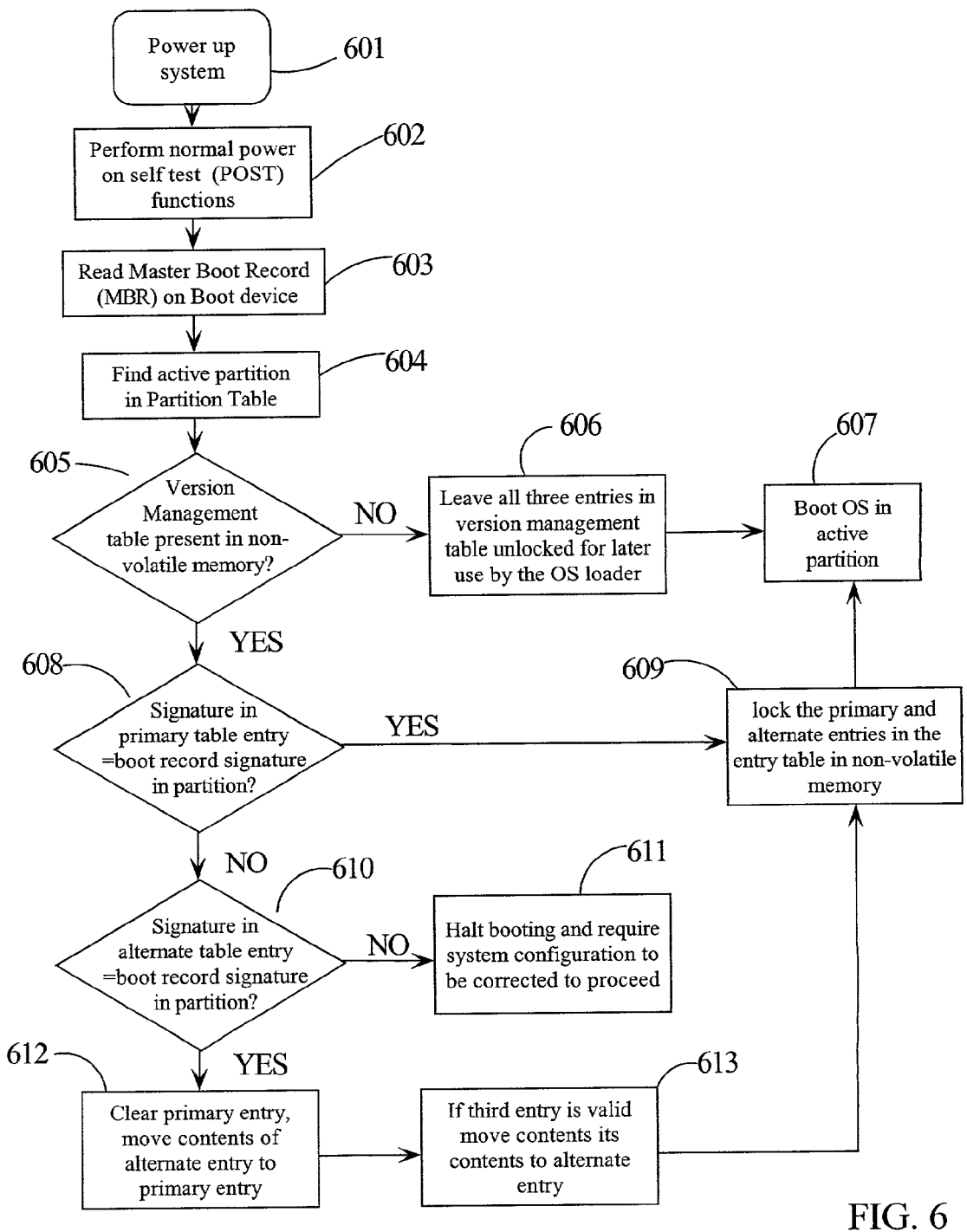
FIG. 6 is a flow chart of method steps in embodiments of the present invention.

FIG. 6 is a flow diagram of one embodiment of the present invention where a version management table may not be present. In step 601, the system 200 is powered up which begins the boot process. In step 602, the normal POST functions are performed. POST reads the MBR on the boot device in step 603. POST searches and finds the active partition in the partition table in step 604. In step 605, a test is done to determine if a version management table is present in non-volatile memory 102. If the result of the test in step 605 is NO, then only one OS version has been loaded in the system 200 and all of the possible entries for the version management table remain unlocked for later use by the OS loader. In step 607, the OS in the active partition is booted.

If the result of the test in step 605 is YES, then in step 608 the signature in the primary table entry is compared to the boot record signature in the active partition. If the result of the compare is YES, then in step 609 the primary and alternate entries in the version management table of the non-volatile memory 102 are locked. A branch is then taken to step 607 where the OS in the active partition is booted. If the result of the test in step 608 is NO, then action has been taken to switch to a new version of the OS. In step 610, the signature of the alternate table entry is compared to the BR in the active partition. If they do not compare then in step 611, the boot process is halted and action must be taken to correct the system configuration before proceeding. If they do compare in step 610, then the alternate entry has been selected as the new version of the OS. In step 612, the primary entry is cleared and the contents of the alternate entry is moved to the primary entry. This effectively prevents the version defined by the primary entry from being used again. If a third entry is present, then the contents of the third entry are moved to the alternate entry in step 613. Whether or not a third entry is valid in step 613, a branch is taken to step 609 where the primary and alternate entries in the version management table are locked. The third entry is left unlocked for use by the OS loader.

Figure 7:
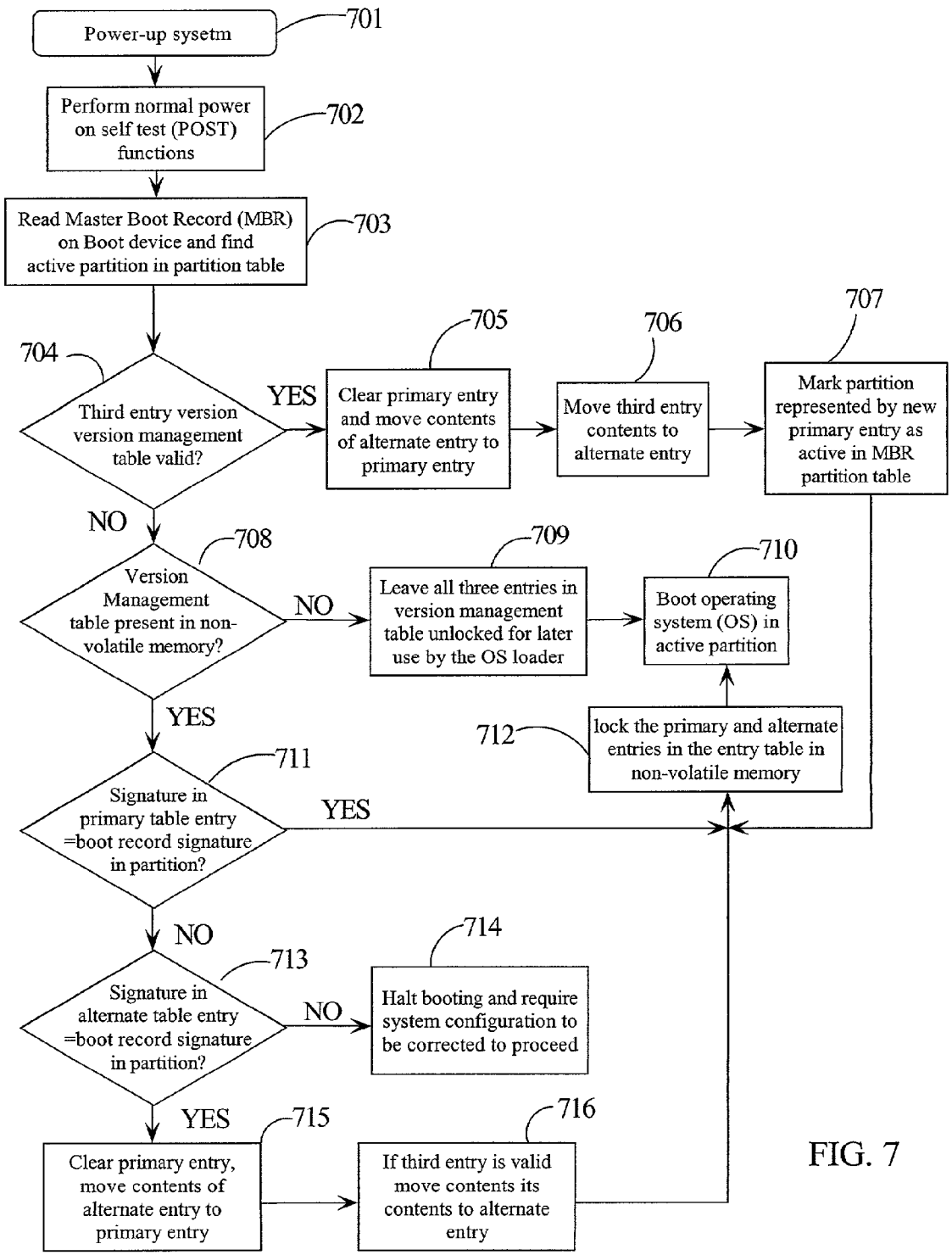
FIG. 7 is a flow chart of method steps in other embodiments of the present invention.

FIG. 7 is a flow diagram of another embodiment of the present invention where the third entry in the table may be used as the "trigger" to activate a switch to a new version of the OS. In step 701 the system 200 is powered up which begins the boot process. In step 702, the normal POST functions are performed. POST reads the MBR on the boot device and searches and finds the active partition in the partition table in step 703. In step 704, a test is done to determine if the third entry in the version management table is valid. If the result of the test in step 604 is YES, then this triggers an action to move to a new version of the OS. When the third entry is valid then in step 705, the primary entry is cleared and the contents of the alternate entry is moved to the primary entry. In step 706, the contents of the third entry are moved to the alternate entry. The partition represented by the new primary entry is then marked as active in the MBR partition table. A branch is then taken to step 712 where the primary and alternate entries are locked in the non-volatile memory and the OS in the active partition is booted in step 710.

If the result of the test in step 605 is YES, then in step 608 the signature in the primary table entry is compared to the boot record signature in the active partition. If the result of the compare is YES, then in step 609 the primary and alternate entries in the version management table of the non-volatile memory 102 are locked. A branch is then taken to step 607 where the OS in the active partition is booted. If the result of the test in step 608 is NO, then action has been taken to switch to a new version of the OS. In step 610, the signature of the alternate table entry is compared to the BR in the active partition. If they do not compare then in step 611, the boot process is halted and action must be taken to correct the system configuration before proceeding. If they do compare in step 610, then the alternate entry has been selected as the new version of the OS. In step 612, the primary entry is cleared and the contents of the alternate entry is moved to the primary entry. This effectively prevents the version defined by the primary entry from being used again. If a third entry is present, then the contents of the third entry are moved to the alternate entry in step 613. Whether or not a third entry is valid in step 613, a branch is taken to step 609 where the primary and alternate entries in the version management table are locked. The third entry is left unlocked for use by the OS loader.

Figure 8:
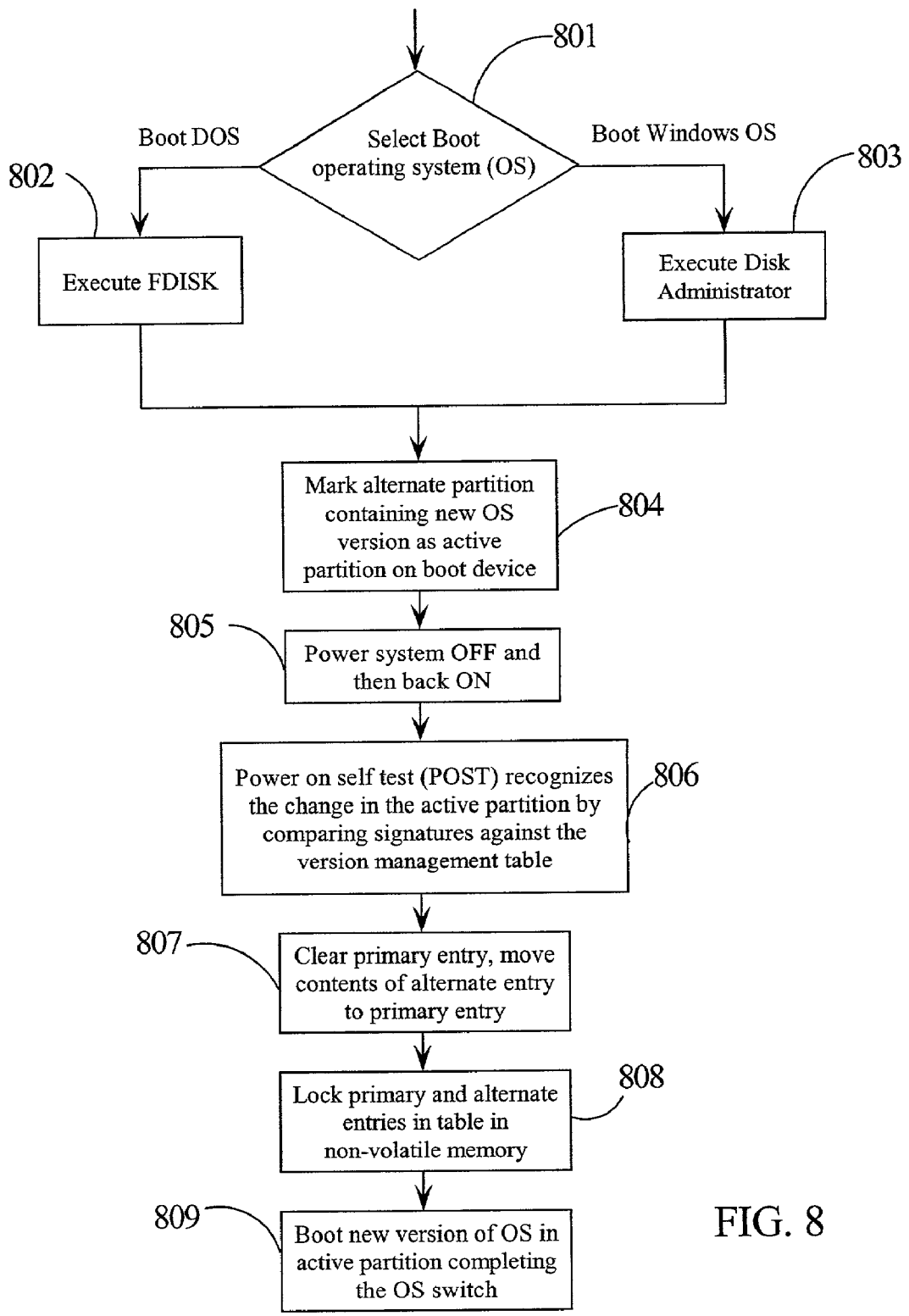
FIG. 8 is a flow chart of method steps in another embodiment of the present invention.

FIG. 8 is an embodiment of the present invention where a switch to a new OS version is triggered by a OS utility changing which version of the OS is the active version. In step 801, the boot OS is selected. A system (e.g., system 200) may be booting with Disk Operating System (DOS) or with a Windows' OS. If booting with DOS, then in step 802 FDISK, which is a DOS utility used to partition the hard disk 203, is executed. If Windows is the booting OS then in step 803, the Disk administrator is executed to do the same function as FDISK. In either case, the appropriate utility is used to mark the alternative partition containing the new OS version as the active partition on the boot device in step 804. In step 805, the system is powered OFF and then ON. This initiates the booting process which in turn activates POST. In step 806, POST recognizes the change in the active partition by comparing signatures against the version management table. In step 807, the primary entry is cleared and the contents of the alternate entry are moved to the primary entry. The primary and alternate entries in the non-volatile memory are then locked in step 808. In step 809, the new version of the OS now in the active partition is booted completing the OS version switch.

Figure 5:
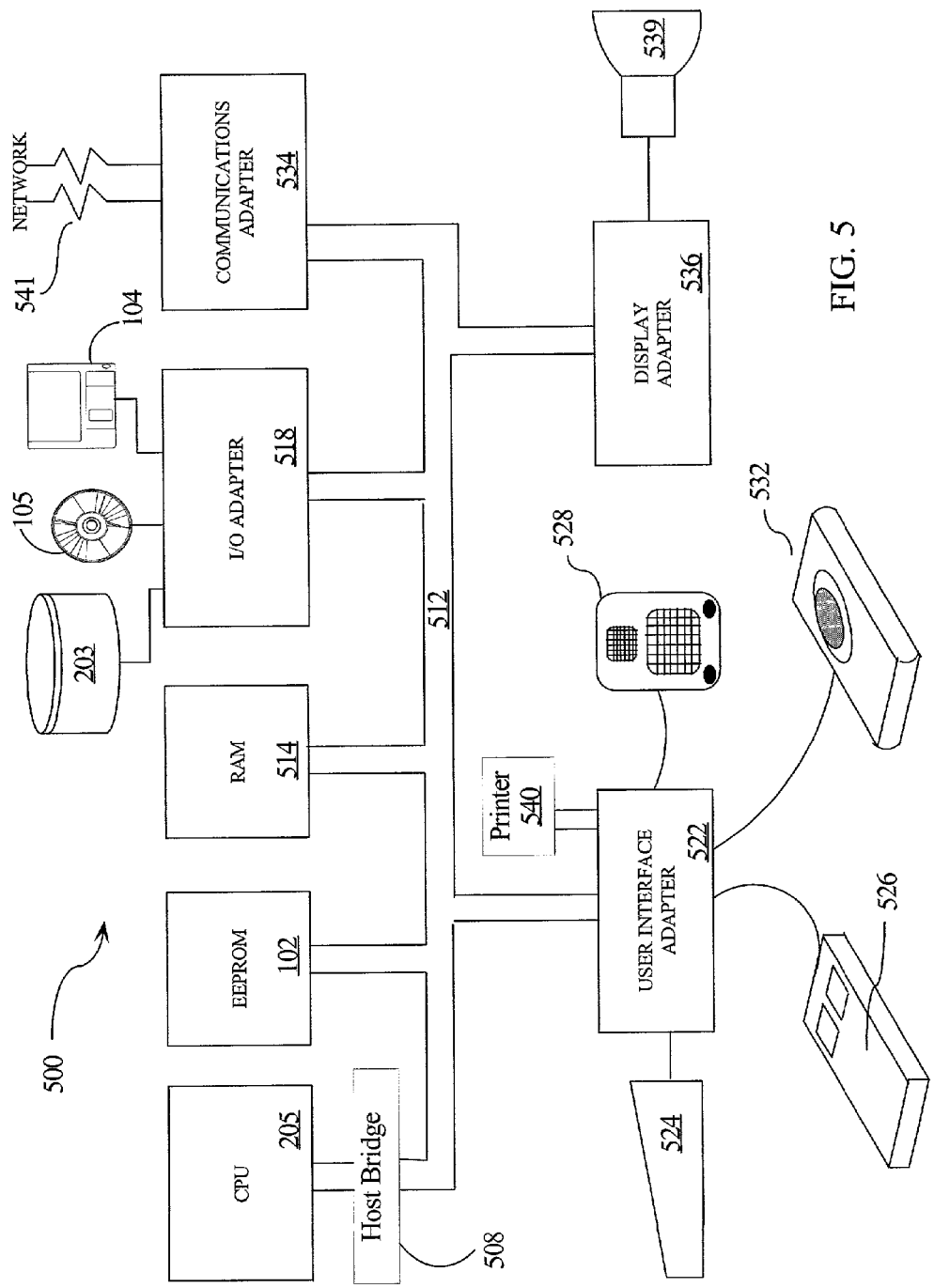
FIG. 5 is a block diagram of a data processing system suitable for practicing principles of embodiments of the present invention.

FIG. 5 is a high level functional block diagram of a representative data processing system 500 suitable for practicing the principles of the present invention. Data processing system 500, includes a central processing system CPU 205 according to embodiments of the present invention and operating in conjunction with Host Bridge 508 and a system bus 512. System bus 512 operates in accordance with a standard bus protocol, such that as the well known Peripheral Control Interface (PCI) protocol, compatible with CPU 205. CPU 205 operates in conjunction with EEPROM 102 and random access memory (RAM) 514. Among other things, EEPROM 102 supports storage for the Basic Input Output System (BIOS) data and signatures and data defining versions of loaded operating systems (OSs according to embodiments of the present invention). RAM 514 includes Dynamic Random Access Memory (DRAM) system memory and Static Random Access Memory (SRAM) external cache. I/O Adapter 518 allows for an interconnection between the devices on system bus 512 and external peripherals, such as mass storage devices (e.g., a hard drive 203, floppy drive 104 or CD/ROM drive 105). Hard drive 203 may have sectors configured to store versions of programs or Operating Systems. User interface adapter 522 couples various user devices, such as a keyboard 524, printer 540, mouse 526, touch pad 532 or speaker 528 to the processing devices on bus 512. Display 539 which may be, for example, a cathode ray tube (CRT), liquid crystal display (LCD) or similar conventional display units. Display adapter 536 may include, among other things, a conventional display controller and frame buffer memory. Data processing system 500 may be selectively coupled to a computer or telecommunications network 541 through communications adapter 535. Communications adapter 534 may include, for example, a modem for connection to a telecom network and/or hardware and software for connecting to a computer network such as a local area network (LAN) or a wide area network (WAN). CPU 205 may be modified to include a read-only lock mechanism according to embodiments of the present invention. CPU 205 may also load a bootable program or OS which is modified to recognize when different versions of a bootable program or OS are loaded. CPU 205 may also have a modified POST according to embodiments of the present invention. Various steps of the method in embodiments of the present invention may be included in a program product which is operable to modify the up-gradable bootable program or OS and the POST.

Although the present invention and its advantages have been described in detail, it should be understood that various changes, substitutions and alterations can be made herein without departing from the spirit and scope of the invention as defined by the appended claims.

What is claimed is:

1. A method for booting a computer system with first and second versions of a bootable program comprising the steps of:
   loading said first and second versions of said bootable program into first and second partitions of a storage device coupled to said computer system;
   hashing a boot record (BR) of said first and second versions of said bootable program producing respective first and second digests;
   signing said first and second digests using a cryptographic signature engine and a private installation key producing first and second signatures;
   storing said first and second signatures with additional data defining said first and second versions of said bootable program in first and second entries in a non-volatile memory coupled to said computer system;
   assigning said first partition as an active partition of said storage device by updating an active partition entry of a partition table of a master boot record (MBR) of said storage device, said active partition entry indicating which version of said BP is booted on a power up of said computer system;
   assigning said first entry corresponding to said first version of said bootable program as an active entry in said non-volatile memory; and
   assigning said second entry corresponding to said second version of said bootable program as an alternate entry in said non-volatile memory.

2. The method of claim 1 further comprising the step of:
   locking said first and second entries in said non-volatile memory with a hardware locking mechanism of said computer system preventing modification of contents of said first and second entries.

3. The method of claim 1, wherein said bootable program is an operating system of said computer system.

4. The method of claim 1 further comprising the steps of:
   loading a BR from said active partition entry of said MBR using Power-On-Self-Test (POST) code when said computer system is powered up;
   decrypting said first signature in said active entry using a public installation key;
   comparing a hash of said BR of said active partition to a hash of a BR retrieved from said active entry, returning a first compare result;
   booting with said first version of said bootable program in said active partition when said first compare result is true; and
   retrieving said second signature from said alternate entry when said first compare result is false.

5. The method of claim 4 further comprising the steps of:
   decrypting said second signature in said alternate entry using said public installation key;
   comparing said hash of said BR of said active partition to a hash of a BR retrieved from said alternate entry, returning a second compare result;
   clearing said active entry from said non-volatile memory when said second compare result is true;
   moving contents from said alternative entry to said active entry; and
   booting with said alternate version identified by said active entry.

6. The method of claim 5 further comprising the step of:

halting said POST when said second compare result is false.

7. The method of claim 1 further comprising the step of:
monitoring a third entry of said non-volatile memory for an indication said third entry is valid.

8. The method of claim 7 further comprising the step of:
moving contents of said second entry to said first entry in response to said valid indication.

9. The method of claim 8 further comprising the steps of:
moving contents of said third entry to said second entry;
marking said second partition corresponding to said second version of said bootable program as said active partition entry in said master boot record; and
booting said version of said bootable program in said active partition.

10. The method of claim 9 further comprising the step of:
locking said first and second entries in said non-volatile memory with a hardware locking mechanism of said computer system preventing modification of contents of said first and second entries.

11. A computer system comprising:
a central processing unit (CPU);
a random access memory (RAM);
an electronically erasable programmable read only memory (EEPROM);
an I/O adapter;
a disk storage system coupled to said I/O adapter; and
a bus system coupling said CPU to said EEPROM, said I/O adapter, and said RAM, wherein said CPU further comprises;
circuitry for loading said first and second versions of said bootable program into first and second partitions of a storage device coupled to said computer system;
circuitry for hashing a boot record (BR) of said first and second versions of said bootable program producing respective first and second digests;
circuitry for signing said first and second digests using a cryptographic signature engine and a private installation key producing first and second signatures;
circuitry for storing said first and second signatures with additional data defining said first and second versions of said bootable program in first and second entries in a non-volatile memory coupled to said computer system;
circuitry for assigning said first partition as an active partition of said storage device by updating an active partition entry of a partition table of a master boot record (MBR) of said storage device, said active partition entry indicating which version of said BP is booted on a power up of said computer system;
circuitry for assigning said first entry corresponding to said first version of said bootable program as an active entry in said non-volatile memory; and
circuitry for assigning said second entry corresponding to said second version of said bootable program as an alternate entry in said non-volatile memory.

12. The computer system of claim 11 further comprising:
locking said first and second entries in said non-volatile memory with a hardware locking mechanism of said computer system preventing modification of contents of said first and second entries.

13. The computer system of claim 11, wherein said bootable program is an operating system of said computer system.

14. The computer system of claim 11 further comprising:
circuitry for loading a BR from said active partition entry of said MBR using Power-On-Self-Test (POST) code when said computer system is powered up;
circuitry for decrypting said first signature in said active entry using said public installation key;
circuitry for comparing a hash of said BR of said active partition to a hash of a BR retrieved from said active entry, returning a first compare result;
circuitry for booting with said first version of said bootable program in said active partition when said first compare result is true; and
circuitry for retrieving said second signature from said alternate entry when said first compare result is false.

15. The computer system of claim 14 further comprising:
circuitry for decrypting said second signature in said alternate entry using said public installation key;
circuitry for comparing said hash of said BR of said active partition to a hash of a BR retrieved from said alternate entry, returning a second compare result;
circuitry for clearing said active entry from said non-volatile memory when said second compare result is true;
circuitry for moving contents from said alternative entry to said active entry; and
circuitry for booting with said alternate version identified by said active entry.

16. The computer system of claim 15 further comprising:
circuitry for halting said POST when said second compare result is false.

17. The computer system of claim 11 further comprising:
circuitry for monitoring a third entry of said non-volatile memory for an indication said third entry is valid.

18. The computer system of claim 17 further comprising:
circuitry for moving contents of said second entry to said first entry in response to said valid indication.

19. The computer system of claim 18 further comprising:
circuitry for moving contents of said third entry to said second entry;
circuitry for marking said second partition corresponding to said second version of said bootable program as said active partition entry in said master boot record; and
circuitry for booting said version of said bootable program in said active partition.

20. The computer system of claim 19 further comprising:
circuitry for locking said first and second entries in said non-volatile memory with a hardware locking mechanism of said computer system preventing modification of contents of said first and second entries.

21. A computer program product for booting a computer system having first and second versions of a bootable program, said computer program product embodied in a machine readable medium, including programming for a processor, said computer program comprising a program of instructions for performing the program steps of:
loading said first and second versions of said bootable program into first and second partitions of a storage device coupled to said computer system;
hashing a boot record (BR) of said first and second versions of said bootable program producing respective first and second digests;
signing said first and second digests using a cryptographic signature engine and a private installation key producing first and second signatures;
storing said first and second signatures with additional data defining said first and second versions of said bootable program in first and second entries in a non-volatile memory coupled to said computer system;

assigning said first partition as an active partition of said storage device by updating an active partition entry of a partition table of a master boot record (MBR) of said storage device, said active partition entry indicating which version of said BP is booted on a power up of said computer system;

assigning said first entry corresponding to said first version of said bootable program as an active entry in said non-volatile memory; and assigning said second entry corresponding to said second version of said bootable program as an alternate entry in said non-volatile memory.

22. The computer program product of claim 21 further comprising the step of:
locking said first and second entries in said non-volatile memory with a hardware locking mechanism of said computer system preventing modification of contents of said first and second entries.

23. The computer program product of claim 21, wherein said bootable program is an operating system of said computer system.

24. The computer program product of claim 21 further comprising the steps of:
loading a BR from said active partition with Power-On-Self-Test (POST) code when said computer system is powered up;
decrypting said first signature in said active entry using a public installation key;
comparing a hash of said BR of said active partition to a hash of a BR retrieved from said active entry, returning a first compare result;
booting with said first version of said bootable program in said active partition when said first compare result is true; and
retrieving said second signature from said alternate entry when said first compare result is false.

25. The computer program product of claim 24 further comprising the steps of:
decrypting said second signature in said alternate entry using said public installation key;
comparing said hash of said BR of said active partition to a hash of a BR retrieved from said alternate entry, returning a second compare result;
clearing said active entry from said non-volatile memory when said second compare result is true;
moving contents from said alternative entry to said active entry; and
booting with said alternate version identified by said active entry.

26. The computer program product of claim 25 further comprising the step of:
halting said POST when said second compare result is false.

27. The computer program product of claim 21 further comprising the step of:
monitoring a third entry of said non-volatile memory for an indication said third entry is valid.

28. The computer program product of claim 27 further comprising the step of:
moving contents of said second entry to said first entry in response to said valid indication.

29. The computer program product of claim 28 further comprising the steps of:
moving contents of said third entry to said second entry;

marking said second partition corresponding to said second version of said bootable program as said active partition entry in said master boot record; and booting said version of said bootable program in said active partition.

30. The computer program product of claim 29 further comprising the step of:
locking said first and second entries in said non-volatile memory with a hardware locking mechanism of said computer system preventing modification of contents of said first and second entries.

31. A method for booting a computer system with first and second versions of a bootable program (BP) comprising the steps of:
loading said first and second versions of said bootable program into first and second partitions of a storage device coupled to said computer system;
identifying said first version as an active partition in a master boot record (MBR) by placing data defining said first version in an active partition entry, said active partition entry indicating which version of said BP is booted on a power up of said computer system;
maintaining a version management table in a non-volatile memory wherein data placed in an active entry indicates which version of said BP corresponds to an active version and wherein data placed in an alternate entry indicates which version of said BP corresponds to an alternate version;
comparing selected data in said active entry in said version management table to selected data pointed to by said active partition entry of said MBR returning a first compare result; and
booting with said version in said active partition if said first compare result is true.

32. The method of claim 31, wherein said active and alternate entries in said version management table are locked with a hardware read only locking mechanism at selected times.

33. The method of claim 31, wherein said bootable program is an operating system of said computer system.

34. The method of claim 31 further comprising the steps of:
replacing said data in said active entry with said data in said alternate entry if said first result is false;
comparing selected data in said active entry in said version management table to selected data pointed to by said active partition entry of said MBR returning a second compare result; and
booting with said alternate version in said active partition if said second compare result is true.

35. The method of claim 34 further comprising the step of:
stopping booting of said computer system if said second compare result is false.

36. The method of claim 31, wherein said active partition pointed to by said active partition entry in said MBR is changed in response to a version management program command sequence.

37. The method of claim 31, wherein said compare step is performed by Power-On Self-Test (POST) code.

38. The method of claim 34, wherein said compare step is performed by Power-On Self-Test (POST) code.

39. The method of claim 31 further comprising the step of:
determining when contents of a third entry of said non-volatile memory are valid.

40. The method of claim 39 further comprising the step of:
moving contents of said alternate entry to said active entry when said contents of said third entry are valid.

41. The method of claim 40 further comprising the steps of:
- moving contents of said third entry to said alternate entry;
- marking a second partition corresponding to said second version of said bootable program as said active partition in said MBR; and
- booting said version of said bootable program in said active partition.

42. The method of claim 41 further comprising the step of:
- locking said active and alternate entries in said non-volatile memory to prevent a modification of contents of said active and alternate entries.

43. A computer system comprising:
- a central processing unit (CPU);
- a random access memory (RAM);
- an electronically erasable programmable read only memory (EEPROM);
- an I/O adapter;
- a disk storage system coupled to said I/O adapter; and
- a bus system coupling said CPU to said EEPROM, said I/O adapter, and said RAM, wherein said CPU further comprises;
- circuitry for loading said first and second versions of said bootable program into first and second partitions of a storage device coupled to said computer system;
- circuitry for identifying said first version as an active partition in a master boot record (MBR) by placing data defining said first version in an active partition entry, said active partition entry indicating which version of said BP is booted on a power up of said computer system;
- circuitry for maintaining a version management table in a non-volatile memory wherein data placed in an active entry indicates which version of said BP corresponds to an active version and wherein data placed in an alternate entry indicates which version of said BP corresponds to an alternate version;
- circuitry for comparing selected data in said active entry in said version management table to selected data pointed to by said active partition entry of said MBR returning a first compare result; and
- circuitry for booting with said version in said active partition if said first compare result is true.

44. The computer system of claim 43, wherein said active and alternate entries in said version management table are locked with a hardware read only locking mechanism at selected times.

45. The computer system of claim 43, wherein said bootable program is an operating system of said computer system.

46. The computer system of claim 43 further comprising:
- circuitry for replacing said data in said active entry with said data in said alternate entry if said first result is false;
- circuitry for comparing selected data in said active entry in said version management table to selected data pointed to by said active partition entry of said MBR returning a second compare result; and
- circuitry for booting with said alternate version in said active partition if said second compare result is true.

47. The computer system of claim 46 further comprising:
- circuitry for stopping booting said computer system if said second compare result is false.

48. The computer system of claim 43, wherein said active partition pointed to by said active partition entry in said MBR is changed in response to a version management program command sequence.

49. The computer system of claim 43, wherein said compare step is performed by Power-On Self-Test (POST) circuitry.

50. The computer system of claim 46, wherein said compare is performed by Power-On Self-Test (POST) circuitry.

51. The computer system of claim 43 further comprising:
- circuitry for determining when contents of a third entry of said non-volatile memory are valid.

52. The computer system of claim 51 further comprising:
- circuitry for moving contents of said alternate entry to said active entry when said contents of said third entry are valid.

53. The computer system of claim 52 further comprising:
- circuitry for moving contents of said third entry to said alternate entry;
- circuitry for marking a second partition corresponding to said second version of said bootable program as said active partition in said MBR; and
- circuitry for booting said version of said bootable program in said active partition.

54. The computer system of claim 53 further comprising:
- circuitry for locking said active and alternate entries in said non-volatile memory to prevent modification of contents of said active and alternate entries.

* * * * *